(12) United States Patent
Devos et al.

(10) Patent No.: US 7,470,030 B2
(45) Date of Patent: Dec. 30, 2008

(54) CABINET-SURFACE-MOUNTED PROJECTION LENS AND METHODS

(75) Inventors: John A. Devos, Corvallis, OR (US);
Gregory J. May, Corvallis, OR (US);
Rachel Fillmore Smythe, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 184 days.

(21) Appl. No.: 11/193,046

(22) Filed: Jul. 28, 2005

(65) Prior Publication Data
US 2007/0024821 A1  Feb. 1, 2007

(51) Int. Cl.
G03B 21/22 (2006.01)
G03B 21/56 (2006.01)
H04N 5/64 (2006.01)

(52) U.S. Cl. .............. 353/74; 353/75; 353/76; 353/97; 348/789; 359/761

(58) Field of Classification Search .......... 353/74, 353/75, 77, 78, 79, 97, 119, 76; 348/739, 348/744, 787, 789, 794, 836, 843; 349/5, 349/6–8; 359/443, 461
See application file for complete search history.

(56) References Cited

U.S. PATENT DOCUMENTS

| | | | |
|---|---|---|---|
| 2,186,570 A | 1/1940 | Bachelor | |
| 2,438,022 A * | 3/1948 | Rundle | 359/449 |
| 2,497,931 A * | 2/1950 | Daly | 353/72 |
| 3,943,282 A | 3/1976 | Muntz | |
| 4,114,291 A | 9/1978 | Taub | |
| 4,171,883 A | 10/1979 | Biancardi | |
| 4,394,681 A | 7/1983 | Rowe | |
| 5,285,268 A * | 2/1994 | Nakagaki et al. | 348/760 |
| 5,483,250 A | 1/1996 | Herrick | |
| 5,543,832 A | 8/1996 | Oravecz et al. | |
| 5,617,226 A * | 4/1997 | Ohmae et al. | 349/10 |
| 5,639,152 A | 6/1997 | Nelson | |
| 6,179,426 B1 | 1/2001 | Rodriguez, Jr. et al. | |
| 6,520,646 B2 | 2/2003 | Rodriguez, Jr. et al. | |
| 6,604,829 B2 | 8/2003 | Rodriguez, Jr. | |
| 6,652,104 B2 | 11/2003 | Nishida et al. | |
| 2001/0017687 A1 | 8/2001 | Rodriguez, Jr. et al. | |
| 2001/0052965 A1 | 12/2001 | Rodriguez, Jr. | |
| 2002/0005915 A1 | 1/2002 | Rodriguez, Jr. | |
| 2004/0080720 A1 * | 4/2004 | Saito | 353/79 |
| 2004/0141157 A1 | 7/2004 | Ramachandran et al. | |
| 2004/0223123 A1 | 11/2004 | Engle et al. | |
| 2004/0257539 A1 | 12/2004 | Peterson et al. | |

OTHER PUBLICATIONS

M. Laikin, "Lens Design" 3rd ed. Marcel Dekker Inc., New York (2001) "Wedge Plates and Rotary Prisms" pp. 291-294.

* cited by examiner

Primary Examiner—Rochelle-Ann J Blackman

(57) ABSTRACT

A projection system includes a cabinet having a surface with an aperture therein, a projector disposed within the cabinet, adapted to project light through the aperture in the surface of the cabinet, and a lens disposed in the aperture to project the light onto a screen disposed generally non-parallel to the cabinet surface having the aperture.

30 Claims, 5 Drawing Sheets

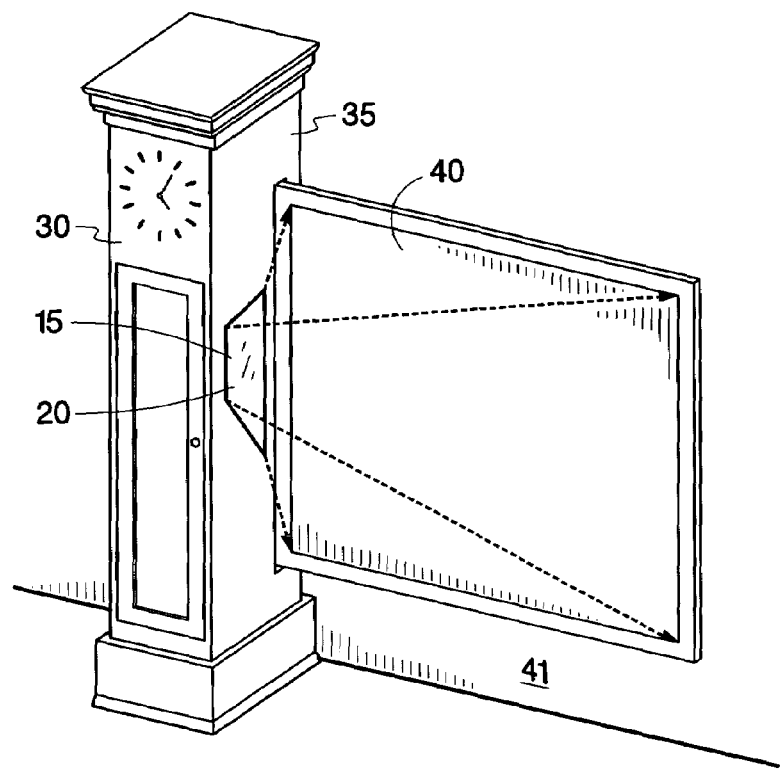
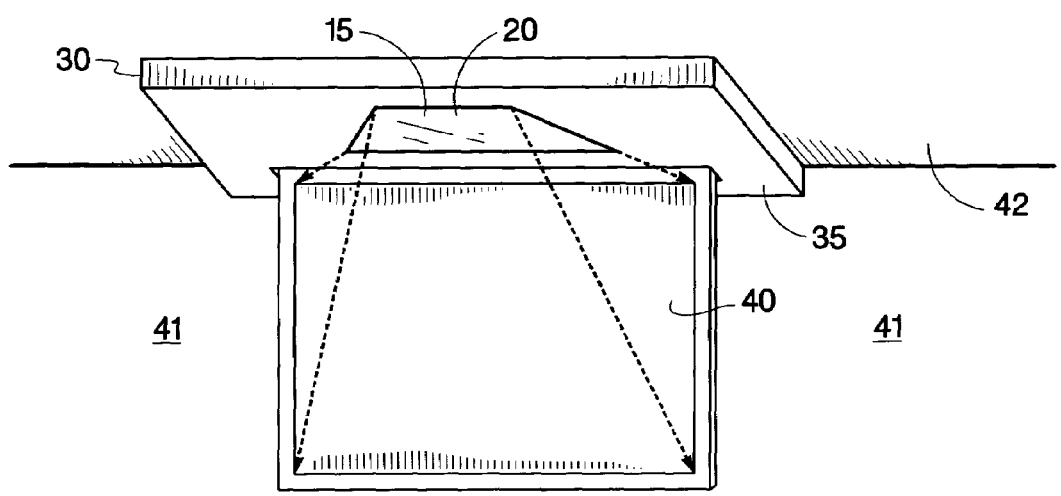
Fig. 8
Fig. 9

CABINET-SURFACE-MOUNTED PROJECTION LENS AND METHODS

TECHNICAL FIELD

This invention relates generally to light projection devices and methods therefor.

BACKGROUND

Projection systems are utilized in many aspects of modern life and provide a wide range of functionality to users. A projector may be included in a projection system to display images on a screen or other display device. A projection system may also be included in a rear-projection television or in a home theater system. Projectors utilize light sources, optical systems, and controllers to display images on a viewing surface, such as a wall or screen, for viewing by a group of people. They are especially popular among business users who give presentations. A projection system, such as a digital projector, may have illumination and imaging systems manufactured with refractive optical elements or reflective optical elements or some combination of both. These optical elements can be susceptible to degradation of performance due to contaminants such as airborne dust from the environment. Dust collecting on optical components is a major problem with optics designs such as those designs using first-surface-coated mirror optics.

Many existing projectors are intended to be used with relatively large screens. A large, permanently mounted screen is not always desirable in small areas, especially in a home environment such as a living room, because such large permanently mounted screens are often aesthetically unpleasing and obtrusive as well as difficult to hide when not in use. Most users would not choose to permanently mount a large screen in front of a window, as the screen would obscure the view through the window. There is a need for projection systems overcoming these shortcomings of the prior art.

BRIEF DESCRIPTION OF THE DRAWINGS

The features and advantages of the disclosure will readily be appreciated by persons skilled in the art from the following detailed description when read in conjunction with the drawings, wherein:

FIG. 8 is a perspective view of a sideways-projecting embodiment of a projection system.

FIG. 9 is a perspective view of a ceiling-mounted embodiment of a projection system.

DETAILED DESCRIPTION OF EMBODIMENTS

Figure 1:
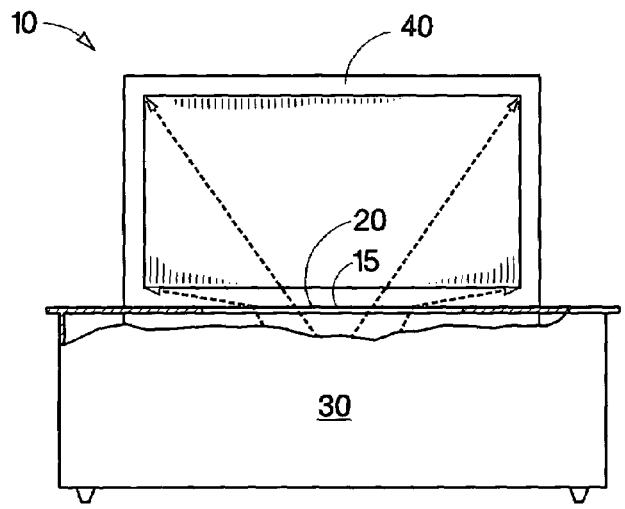
FIG. 1 is a partially cutaway front elevation view of an embodiment of a projection system.

For clarity of the description, the drawings are not drawn to a uniform scale. In particular, vertical and horizontal scales may differ from each other and may vary from one drawing to another. In this regard, directional terminology, such as "top," "bottom," "front," "back," etc., is used with reference to the orientation of the drawing figure(s) being described. Because components of the invention can be positioned in a number of different orientations, the directional terminology is used for purposes of illustration and is in no way limiting.

As used in this specification and the appended claims, the term "screen" generally means a viewing surface. In some embodiments or uses, a screen may be an existing wall or a separate screen disposed in a projection system's environment, while in other embodiments or uses, the screen may be integral to the projection system. The term "effective focal ratio" as applied to a lens that may not be round means the focal ratio of a conventional round lens having the same lens clear area and the same focal length as the lens being characterized.

One aspect of the invention provides embodiments of a projection system 10, as shown in FIGS. 1-5, 7, and 8. Such a projection system embodiment include a cabinet 30 with a suitable surface 35 having an aperture 15 in it, a projector 50 within the cabinet, the projector being adapted to project light through the aperture 15 in the surface of the cabinet, and a lens 20 disposed in the aperture 15 to project the light onto a screen or wall. The system may also include a screen 40 that may be stowed within the cabinet when not in use and may be disposed in a substantially vertical position when needed for displaying an image projected through the aperture when the screen is in its substantially vertical position. Surface 35 is a surface oriented substantially perpendicular to the wall or screen upon which an image is to be projected, or oriented at least generally non-parallel to the wall or screen. Thus, the surface 35 in which lens 20 is mounted is not generally parallel to the screen as it would normally be in a conventional projection system. Surface 35 may be a top surface of cabinet 30, as shown in the example embodiments of FIGS. 1-5. Other arrangements are described below with reference to FIGS. 8 and 9. Some embodiments of the projection system may be used as an all-in-one digital entertainment center with a short-throw projector and retractable screen built into a cabinet. In these embodiments and others, it is not always necessary for cabinet 30 to be completely enclosed, but cabinet 30 may be a table having selected portions, such as the projector 50, enclosed. In such embodiments, the enclosed portion is generally at least behind aperture 15 so that projector 50 can be properly aligned with aperture 15. The enclosed portion may be a drawer (not shown).

The lens 20 serves more than one purpose: it is adapted to seal the aperture 15 against contaminant penetration into the cabinet 30 (or at least its enclosed portion), and it is an integral part of the optical projection system, enhancing its optical functions. Lens 20 may be an integral part of surface 35 or may be at the same level (flush with the surface) or above or below the top surface in embodiments in which surface 35 is the top surface.

Figure 3:
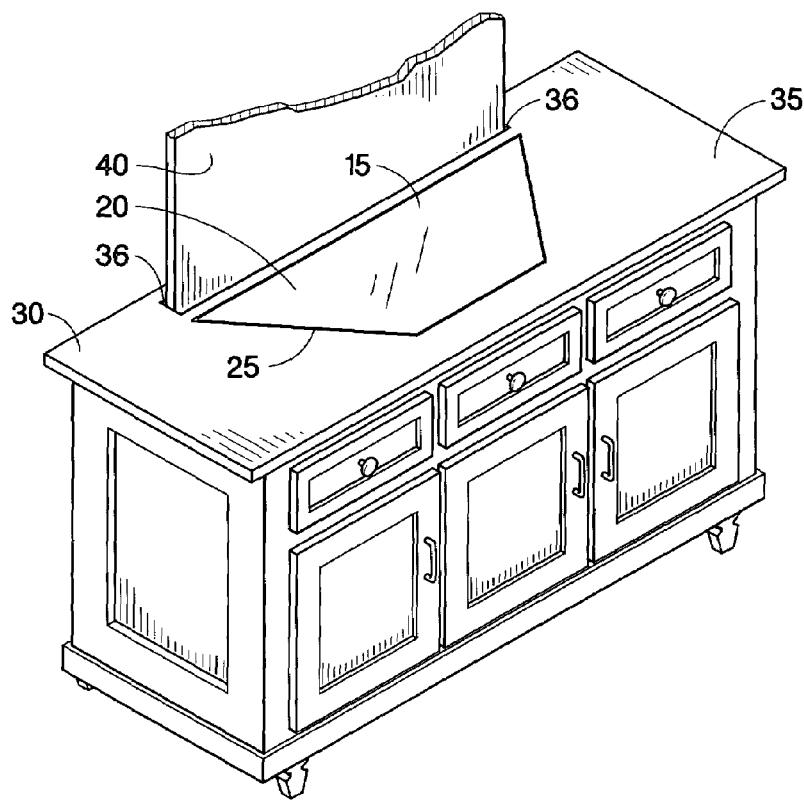
FIG. 3 is a perspective view of another embodiment of a projection system.

As shown in FIG. 3, aperture 15 may be generally trapezoidal, and lens 20 may fill the aperture. Thus, lens 20 may have its edge 25 contoured to match and fit the aperture 15 so that the lens fills the aperture. In the embodiment shown in FIG. 3, aperture 15 is generally trapezoidal and lens 20 has a trapezoidal edge 25 contoured to match and fit the aperture, whereby lens 20 fills aperture 15.

Figure 4:
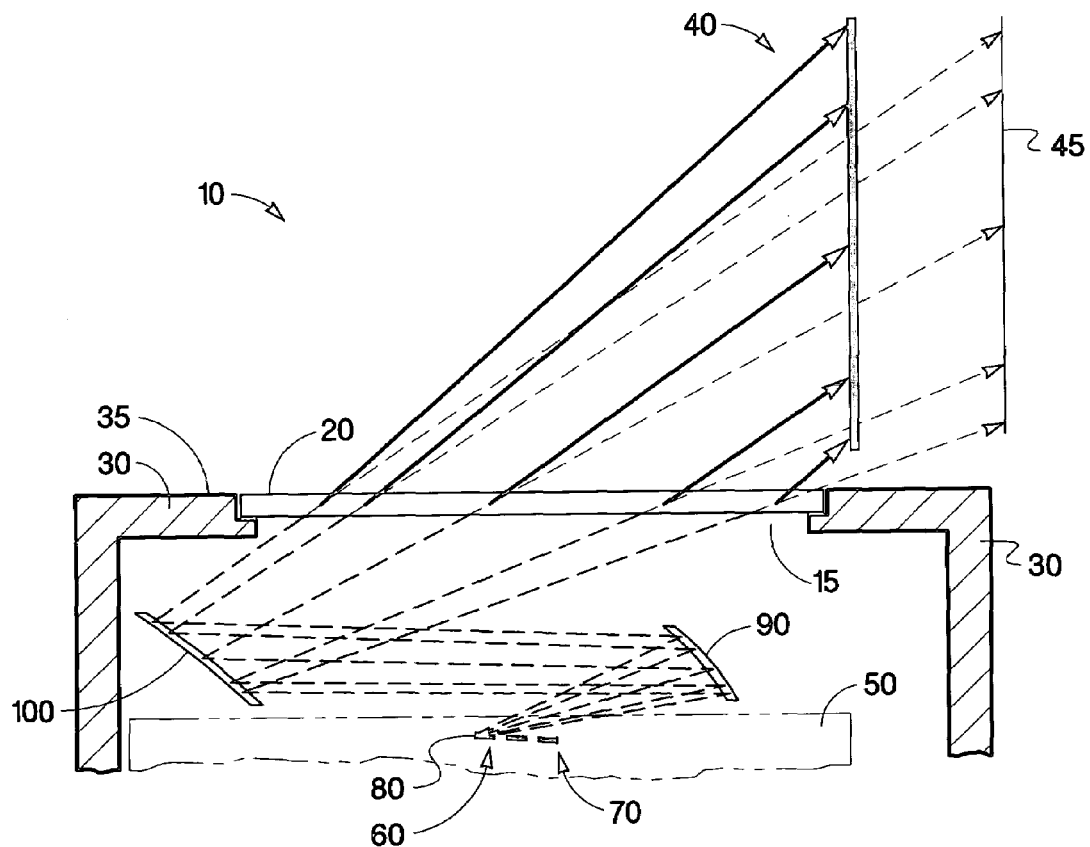
FIG. 4 is a schematic side-elevation cross-section view of a portion of an embodiment of a projection system.

As shown in FIG. 4, projector 50 may include an image source 60 and first and second first-surface mirrors 70 and 80. For some embodiments, third and fourth intermediate first-surface mirrors 90 and 100 may be used. Those skilled in the art will recognize that a four-mirror, one-lens hybrid (reflective and refractive) optical system is only one of various optical configurations that may be used in various embodiments of projections systems made in accordance with the present invention. Some other embodiments may have fewer than five optical elements.

As shown in FIG. 4, an image would be projected onto a screen surface 45 in the absence of lens 20. With lens 20 in place, the image is projected onto screen 40, which is closer to lens 20 than screen surface 45. Thus the throw distance, defined as the distance from the center of lens 20 to screen 40, may be shortened by the use of lens 20.

For many applications, it is desirable to form lens 20 with a substantially planar top surface and to mount lens 20 so that its substantially planar top surface is substantially flush with surface 35 of cabinet 30. Such an arrangement is particularly easy to keep clean. In some embodiments, the planar top surface may be achieved by using a lens comprising a top plate having a substantially planar top surface and another optical element disposed beneath the top plate. Thus, some embodiments of the lens 20 consist of two or more parts combined to perform as one lens.

Those skilled in the optical arts will recognize that lens 20 may be formed of one or more plastic materials and/or of one or more glass materials. Also, lens 20 may have an anti-reflection coating on any or all of its surfaces. Similarly, lens 20 may include a hard protective transparent coating on its top surface or any outer surface, to prevent physical damage such as scratching or abrasion. Both anti-reflection coatings and hard protective coatings are well known in the optical arts and are readily available from many commercial sources, such as suppliers of coating materials for the ophthalmic lens industry.

Lens 20 may comprise a refractive optical element and/or a diffractive optical element. For example, lens 20 may comprise a Fresnel lens. Generally, lens 20 may have any suitable focal length and effective focal ratio, such as a focal length of about 0.6 meter (about 25 inches) or greater and an effective focal ratio of about f/1 or smaller. Lens 20 may also perform a prismatic function. Lens 20 may comprise a holographic optical element and may be an electrohologram, whereby at least one optical property is electrically adjustable.

Generally, lens 20 is substantially transparent to radiation in a selected portion of the electromagnetic spectrum. For example, that selected portion may include the visible spectrum and at least a portion of the ultraviolet spectrum, or may include the visible spectrum and at least a portion of the infrared spectrum, or may include only the visible spectrum.

Figure 5:
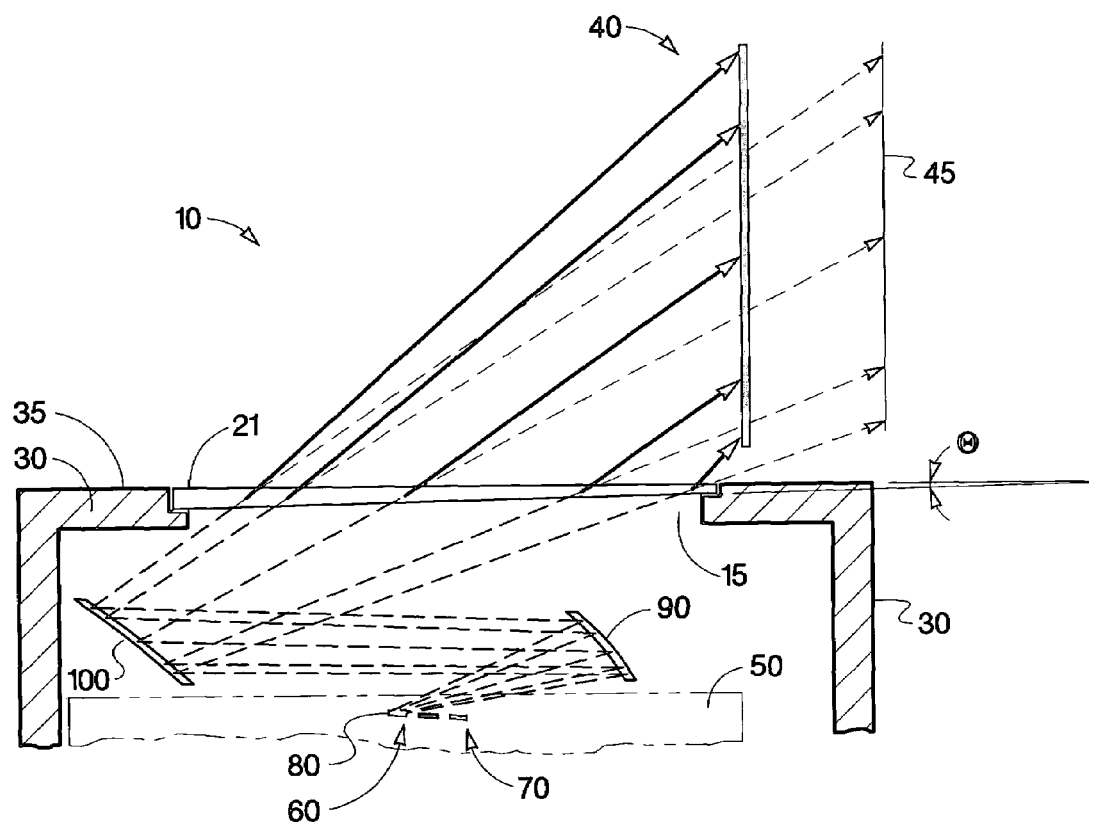
FIG. 5 is a schematic side-elevation cross-section view of a portion of another embodiment of a projection system.

A specific example of a suitable embodiment 21 of lens 20 is shown in a side elevation cross-section view in FIG. 5. As shown in FIG. 5, lens embodiment 21 has a prism or wedge cross section and thus performs a prismatic function. The angle between the planar top and bottom surfaces of lens embodiment 21 is exaggerated in FIG. 5 for clarity of illustration. No top plan view of lens embodiment 21 is shown, but lens embodiment 21 may have a generally trapezoidal shape in such a view, bounded by an edge contour 25 as shown for lens 20 in FIG. 3.

The width (front to back) and longer length (left to right) of lens embodiment 21 may be about 0.3 meter (or about 11 inches) and 0.75 meter (or about 30 inches) respectively, for example. The thickness at the center of lens embodiment 21 may be about 6.35 mm (about 0.25 inch) for example. The lens top surface and an axis normal to it may be oriented at about 45 degrees to the projection axis. For an embodiment composed of a uniform-index material, the material may be BK7 glass, for example, with a refractive index of 1.51872, and the included wedge angle θ (theta) between the planar top and bottom surfaces of lens embodiment 21 may be 0.00135906 radian or about 4.672 arc-min. With these parameters, the projected rays appear to diverge from a point located behind lens embodiment 21 at a distance of about 0.46 meter or 18 inches along the projection axis. BK7 glass is commercially available from Schott North America, Inc. of Duryea, Pa. (http://www.us.schott.com/), for example.

Advantages of lens embodiment 21 over a flat plate of glass or other material include the benefit that coma and astigmatism problems that would occur with a flat plate of glass are reduced or eliminated. For example, such a wedge lens may be custom-designed for a specific application by using parameters calculated for zero astigmatism according to De Lang, as described in the book by Milton Laikin, "Lens Design" (Third Edition Revised and Expanded, Marcel Dekker, Inc., New York, March 2001, Chapter 27, pp. 291-294), which pages are incorporated herein by reference.

While lens embodiment 21 is illustrated in this example as if it had a uniform composition of BK7 glass, this embodiment and other embodiments of lens 20 may be composed of combinations of various materials conventionally used to make lenses, such as crown and flint glasses, other optical glasses, or optical grade polymers. Or, it may be composed of a material having a suitably varying non-uniform index of refraction, such as a graded index of refraction.

The size of aperture 15 may be adjustable, for example, by providing at least one movable opaque element (not shown) adapted to selectively mask off a portion of the aperture 15. The movable opaque element may be adapted for varying either the size or the aspect ratio of an image projected on the screen, or for varying both the size and the aspect ratio. For example, two movable opaque elements may be provided which are adapted to selectively mask off two portions of the aperture. Specifically, for embodiments such as that of FIG. 3, in which aperture 15 has at least two parallel edges, the two movable opaque elements may be adapted to selectively mask off two portions of the aperture by extending inward perpendicularly to the two parallel edges. Similarly, four movable opaque elements may be provided to selectively mask off portions of the aperture. Thus, for particular embodiments in which the aperture is trapezoidal as in the embodiment shown in FIG. 3, for example, the four movable opaque elements may be arranged to selectively mask off four portions of the aperture 15 by extending inwardly from the sides of the trapezoid. Conventional mechanical and/or electromechanical arrangements (such as photographic shutters and variable-aperture irises) for moving opaque elements with respect to apertures for masking are well known in the optical arts and are therefore not shown in the drawings. For example, such mechanical and/or electromechanical arrangements may include conventional electric motors or solenoids driving conventional gears, cams, or levers connected to the opaque masking elements. The opaque masking elements may have a flat black finish to prevent unwanted reflections.

Figure 6:
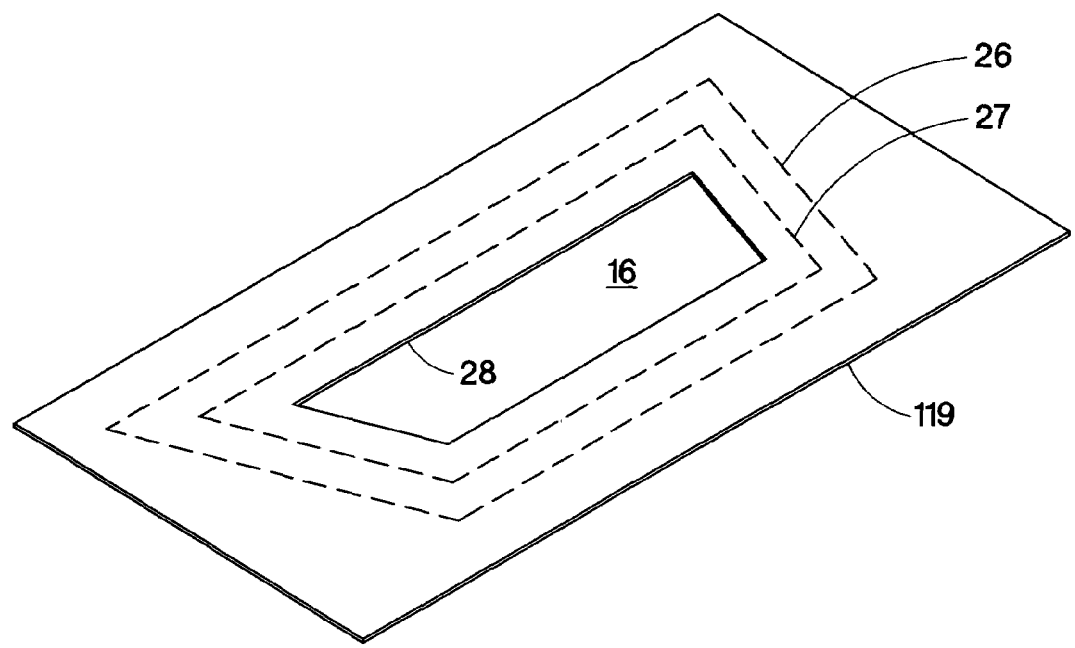
FIG. 6 is a perspective view of an embodiment of a set of apertures for a set of discrete masks for an embodiment of a projection system.
Figure 7:
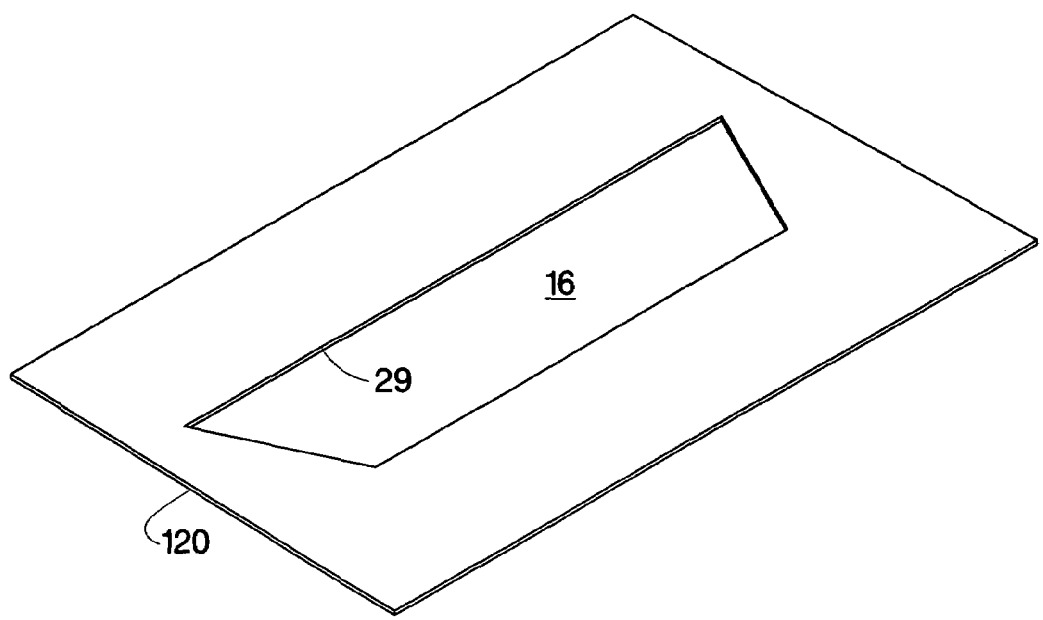
FIG. 7 is a perspective view of an embodiment of a particular mask for an embodiment of a projection system.

Another approach for masking off selected portions of the aperture 15 is represented by embodiments using a set of discrete masks, each mask having a mask aperture. As in the case of moving opaque elements, the mask apertures of the set of masks may be adapted for varying the size or the aspect ratio of an image projected on the screen, or for varying both the size and the aspect ratio. For example, FIG. 6 shows schematically a set of mask-apertures defined by edges 26, 27, and 28 cut in separate flat sheets 119 of opaque material. The aperture 16 for each mask is generally smaller than aperture 15 in surface 35 of cabinet 30. In the set of apertures illustrated in FIG. 6, the size of the projected image may be varied, while preserving the aspect ratio. FIG. 7 illustrates a discrete mask 120 with an aperture 16 bounded by edge contour 29, which may be used to vary the aspect ratio of an image projected on the screen (having an aspect ratio that differs, for example, from that of the various mask apertures shown schematically in FIG. 6 for various discrete masks). Similarly, sets of discrete masks may be made which vary in both mask aperture size and mask aperture aspect ratio within the set. A mask selected from the set of discrete masks may be placed over the lens when needed and may be at least partially aligned with the lens.

Cabinet 30 may be positioned parallel to a wall of the room in which it is to be used. If screen 40 is deployed in its substantially vertical position, images may be projected onto screen 40 for viewing. If the screen remains stowed in cabinet 30, images may be projected on the wall adjacent to the rear of cabinet 30 for viewing. Cabinet 30 may even be positioned parallel to a wall in front of a window, as the screen will generally obscure the window only when the screen is in use and is deployed in its vertical position.

The dimensions of cabinet 30 may be chosen so that the depth of the cabinet does not exceed about 0.6 meter in a direction perpendicular to the screen when the screen is deployed in its substantially vertical position. Various dimensions of the projection system may be chosen such that the throw distance as measured from the center of aperture 15 to the plane of the projected image does not exceed about 0.6 meter.

Figure 2:
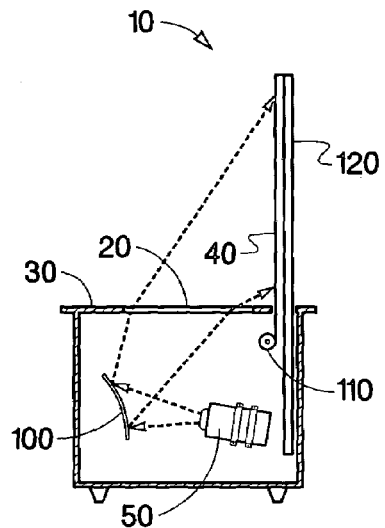
FIG. 2 is a cross-sectional side elevation view of the projection system embodiment of FIG. 1.

Screen 40 is retractable into cabinet 30 through an opening 36 (FIG. 3) for stowing the screen when it is not needed. Screen 40 may be wound onto a roll 110 inside cabinet 30, for example (FIG. 2). A conventional mechanical arrangement 120 (shown schematically in FIG. 2) allows retraction and deployment of screen 40 as needed. As the mechanical arrangement 120 is entirely conventional, its details are not shown in the drawings. Thus, when screen 40 is not needed, it may be hidden from view by retracting it into cabinet 30 through opening 36. A cover (not shown) may also be provided to cover opening 36.

FIG. 8 is a perspective view of a sideways-projecting embodiment of a projection system, disposed to project an image onto a screen 40 or onto wall 41. In the embodiment of FIG. 8, surface 35 is a side wall of cabinet 30. FIG. 9 is a perspective view of a ceiling-mounted embodiment of a projection system. In the embodiment of FIG. 9, surface 35 is a bottom wall of cabinet 30. While FIG. 9 shows cabinet 30 attached to ceiling 42, other embodiments may have cabinet 30 embedded into ceiling 42, for example, with surface 35 flush with ceiling 42 or integral with ceiling 42. In the embodiments of FIGS. 8 and 9, cabinet 30 is disposed with surface 35 substantially perpendicular to screen 40 or wall 41 or at least generally non-parallel to screen 40 or wall 41.

Another aspect of the invention is a method of using a projector in a projection system. A cabinet having a surface is provided, with an aperture provided in the surface. A projector is disposed within the cabinet, the projector being adapted to project light through the aperture in the surface of the cabinet in the direction of a wall or screen that is generally perpendicular or at least non-parallel to the cabinet surface. A screen may be provided and may be adapted to be stowed within the cabinet when not in use and adapted to be disposed in a substantially vertical position when needed for displaying an image projected through the aperture. A lens is inserted, into the aperture for projecting an image on the screen when the screen is disposed in its substantially vertical position. The lens is adapted to fill the aperture in order to prevent penetration of contaminants into the cabinet through the aperture. Opaque mask elements may be provided to vary the size and/or aspect ratio of the projected image.

In use of the projection system, a user provides a suitable input to the projector and projects the light from the projector through the lens onto the screen or a wall.

INDUSTRIAL APPLICABILITY

Devices made in accordance with the invention and methods performed in accordance with the invention are useful in many applications, including information presentations and home-entertainment applications such as television. They may also be used in computer-related applications in a home, office, or other environment.

Although the foregoing has been a description and illustration of specific embodiments of the invention, various modifications and changes thereto can be made by persons skilled in the art without departing from the scope and spirit of the invention as defined by the following claims. For example, functionally equivalent materials may be substituted for materials mentioned in this description, and functionally equivalent elements may be substituted for various elements of the exemplary embodiments described herein. For example, the lens may comprise a combination of elements formed of materials having different indices of refraction in order to provide desired optical properties of the lens as a whole. Also, for another example, a conventional sealant disposed between the edge of the lens and the edge of the aperture may be used to provide improved contaminant protection.

What is claimed is:

1. A projection system for projecting light onto a screen, the system comprising:
    a) a cabinet having a cabinet surface, the cabinet surface having an aperture therein, the aperture being generally trapezoidal,
    b) a projector disposed within the cabinet, the projector being adapted to project light through the aperture in the cabinet surface toward a screen oriented generally non-parallel to the cabinet surface, and
    c) a lens disposed in the aperture to project the light, the lens substantially filling the aperture.

2. The projection system of claim 1, further comprising:
    d) a screen adapted to be stowed within the cabinet when not in use and to be disposed in a viewing position when needed for displaying an image projected through the aperture, the lens being adapted to project the image on the screen when the screen is disposed in its viewing position.

3. The projection system of claim 2, wherein the screen in its viewing position is in a substantially vertical position.

4. The projection system of claim 2, wherein the lens has a top surface, and the top surface of the lens is disposed to be substantially perpendicular to the screen when the screen is disposed in its viewing position.

5. The projection system of claim 1, wherein the lens has a substantially planar top surface.

6. The projection system of claim 5, wherein the substantially planar top surface of the lens is substantially flush with the cabinet surface.

7. The projection system of claim 1, wherein the lens comprises:
   i) a top portion having a substantially planar top surface, and
   ii) an optical element disposed beneath the top portion.

8. The projection system of claim 1, wherein the lens comprises at least one material selected from the list consisting of plastic materials, glass materials, and mixtures and combinations thereof.

9. The projection system of claim 1, wherein the lens further comprises an anti-reflection coating.

10. The projection system of claim 1, wherein the lens further comprises a hard protective transparent coating on at least its top surface.

11. The projection system of claim 1, wherein the lens comprises at least one element selected from the list consisting of a refractive optical element, a diffractive optical element, a Fresnel lens, a holographic optical element, an electrohologram, and combinations thereof.

12. The projection system of claim 1, wherein the lens is substantially transparent to radiation in a selected portion of the electromagnetic spectrum including a portion of at least one of the visible spectrum, the ultraviolet spectrum, and the infrared spectrum, and combinations thereof.

13. The projection system of claim 1, further comprising at least one movable opaque element adapted to selectively mask off a portion of the aperture, whereby at least one of the size and the aspect ratio of an image projected through the aperture is adjustable.

14. The projection system of claim 13, wherein the aperture has at least two parallel edges, the projection system further comprising two or more movable opaque elements adapted to selectively mask off portions of the aperture by extending inward perpendicularly to the at least two parallel edges.

15. The projection system of claim 1, further comprising a set of masks adapted for masking off selected portions of the aperture, each mask having a mask aperture, the mask apertures of the set of masks being adapted for varying at least one of the size and the aspect ratio of an image projected.

16. A projection system for projecting light onto a screen, the system comprising:
   a) a cabinet having a cabinet surface, the cabinet surface having an aperture therein, wherein the aperture has a center,
   b) a projector disposed within the cabinet, the projector being adapted to project light through the aperture in the cabinet surface toward a screen oriented generally non-parallel to the cabinet surface, and
   c) a lens disposed in the aperture to project the light, the lens substantially filling the aperture, and the throw distance as measured from the center of the aperture does not exceed about 0.6 meter.

17. A projection system for projecting light onto a screen, the system comprising:
   a) a cabinet having a cabinet surface, the cabinet surface having an aperture therein,
   b) a projector disposed within the cabinet, the projector being adapted to project light through the aperture in the cabinet surface toward a screen oriented generally non-parallel to the cabinet surface, and
   c) a lens disposed in the aperture to project the light, the lens substantially filling the aperture, wherein the lens has an edge contoured to match and fit the aperture, whereby the lens fills the aperture, and whereby the lens is adapted to seal the aperture against penetration of contaminants into the cabinet.

18. A projection system for projecting light onto a screen, the system comprising:
   a) a cabinet having a cabinet surface, the cabinet surface having an aperture therein,
   b) a projector disposed within the cabinet, the projector being adapted to project light through the aperture in the cabinet surface toward a screen oriented generally non-parallel to the cabinet surface, and
   c) a lens disposed in the aperture to project the light, the lens substantially filling the aperture, wherein a top surface of the lens is exposed, wherein the lens performs a prismatic function.

19. A projection system for projecting light onto a screen, the system comprising:
   a) a cabinet having a cabinet surface, the cabinet surface having an aperture therein,
   b) a projector disposed within the cabinet, the projector being adapted to project light through the aperture in the cabinet surface toward a screen oriented generally non-parallel to the cabinet surface, and
   c) a lens disposed in the aperture to project the light, the lens substantially filling the aperture, wherein the lens has a focal length of about 0.6 meter or greater.

20. A projection system for projecting light onto a screen, the system comprising:
   a) a cabinet having a cabinet surface, the cabinet surface having an aperture therein,
   b) a projector disposed within the cabinet, the projector being adapted to project light through the aperture in the cabinet surface toward a screen oriented generally non-parallel to the cabinet surface, and
   c) a lens disposed in the aperture to project the light, the lens substantially filling the aperture, wherein the lens has an effective focal ratio of about f/1 or smaller.

21. A projection system for projecting light onto a screen, the system comprising:
   a) a cabinet having a cabinet surface, the cabinet surface having an aperture therein, wherein the aperture is trapezoidal,
   b) a projector disposed within the cabinet, the projector being adapted to project light through the aperture in the cabinet surface toward a screen oriented generally non-parallel to the cabinet surface,
   c) a lens disposed in the aperture to project the light, the lens substantially filling the aperture, and
   d) four movable opaque elements adapted to selectively mask off portions of the aperture by extending inwardly from the sides of the trapezoid.

22. A projection system, comprising:
   a) means for enclosing the system, having a surface, the surface having an aperture therein, the aperture being generally trapezoidal,
   b) means for projecting an image through the aperture in the surface of the means for enclosing,
   c) means for displaying an image projected through the aperture, the means for displaying being adapted to be disposed in a viewing position when in use and otherwise may be stowed within the means for enclosing, and
   d) optical means for focusing disposed in the aperture to project light on the means for displaying when the means for displaying is disposed in its viewing position and to protect the means for projecting from contaminants.

23. The projection system of claim 22, wherein the optical means for focusing has a substantially planar top surface and fills the aperture.

24. A method of using a projector in a projection system for projection of light onto a screen, the method comprising the acts of:
   a) providing a cabinet having a cabinet surface, the cabinet surface having an aperture therein, the aperture being generally trapezoidal,
   b) providing a projector disposed within the cabinet, the projector being adapted to project light through the aperture in the cabinet surface onto a screen disposed generally non-parallel to the cabinet surface, and
   c) inserting a lens into the aperture for projecting light onto the screen, the lens being adapted to fill the aperture, thereby preventing penetration of contaminants into the cabinet through the aperture.

25. The method of claim 24, further comprising the act of:
   d) providing a screen adapted to be stowed within the cabinet when not in use and adapted to be disposed in a viewing position when needed for displaying light projected through the aperture.

26. The method of claim 24, further comprising the act of:
   e) providing at least one movable opaque masking element to vary at least one of the size and the aspect ratio of the projected image.

27. A projection system for projecting light onto a screen, the system comprising:
   a) a cabinet having a cabinet surface, the cabinet surface having an aperture therein,
   b) a projector disposed within the cabinet, the projector being adapted to project light through the aperture in the cabinet surface toward a screen oriented generally non-parallel to the cabinet surface, and
   c) a lens disposed in the aperture to project the light, the lens substantially filling the aperture, wherein the lens has an effective focal ratio of about f/1 or smaller, wherein the lens has an edge contoured to match and fit the aperture, whereby the lens fills the aperture, and whereby the lens is adapted to seal the aperture against penetration of contaminants into the cabinet.

28. A projection system for projecting light onto a screen, the system comprising:
   a) a cabinet having a cabinet surface, the cabinet surface having an aperture therein, wherein the aperture is trapezoidal,
   b) a projector disposed within the cabinet, the projector being adapted to project light through the aperture in the cabinet surface toward a screen oriented generally non-parallel to the cabinet surface,
   c) a lens disposed in the aperture to project the light, the lens substantially filling the aperture, wherein the lens has an effective focal ratio of about f/1 or smaller, and
   d) four movable opaque elements adapted to selectively mask off portions of the aperture by extending inwardly from the sides of the trapezoid.

29. A projection system, comprising:
   a) means for enclosing the system, the means for enclosing having a surface, the surface having an aperture therein, the aperture being generally trapezoidal,
   b) means for projecting an image through the aperture in the surface of the means for enclosing,
   c) means for displaying an image projected through the aperture, the means for displaying being adapted to be disposed in a viewing position when in use and otherwise adapted to be stowed within the means for enclosing, and
   d) optical means for focusing disposed in the aperture to project light on the means for displaying when the means for displaying is disposed in its viewing position and to protect the means for projecting from contaminants, wherein the optical means for focusing has an effective focal ratio of about f/1 or smaller.

30. A method of using a projector in a projection system for projection of light onto a screen, the method comprising the acts of:
   a) providing a cabinet having a cabinet surface, the cabinet surface having an aperture therein, the aperture being generally trapezoidal,
   b) providing a projector disposed within the cabinet, the projector being adapted to project light through the aperture in the cabinet surface onto a screen disposed generally non-parallel to the cabinet surface, and
   c) inserting a lens into the aperture for projecting light onto the screen, the lens being adapted to fill the aperture, thereby preventing penetration of contaminants into the cabinet through the aperture, and the lens having an effective focal ratio of about f/1 or smaller.

* * * * *